US012163602B2

(12) United States Patent
Fan et al.

(10) Patent No.: US 12,163,602 B2
(45) Date of Patent: Dec. 10, 2024

(54) CONTROL VALVE STRUCTURE, USING METHOD THEREOF, MICROFLUIDIC CHIP, AND NUCLEIC ACID EXTRACTION DEVICE

(71) Applicants: Beijing BOE Technology Development Co., Ltd., Beijing (CN); BOE Technology Group Co., Ltd., Beijing (CN)

(72) Inventors: Beiyuan Fan, Beijing (CN); Weifeng Xu, Beijing (CN); Ding Ding, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/790,332

(22) PCT Filed: Aug. 17, 2021

(86) PCT No.: PCT/CN2021/113108
§ 371 (c)(1),
(2) Date: Jun. 30, 2022

(87) PCT Pub. No.: WO2023/019447
PCT Pub. Date: Feb. 23, 2023

(65) Prior Publication Data
US 2024/0175521 A1 May 30, 2024

(51) Int. Cl.
*F16K 99/00* (2006.01)
(52) U.S. Cl.
CPC ...... *F16K 99/0015* (2013.01); *F16K 99/0046* (2013.01); *F16K 2099/0084* (2013.01)

(58) Field of Classification Search
CPC ............ F16K 99/0015; F16K 99/0046; F16K 99/0048; F16K 2099/0084
See application file for complete search history.

(56) References Cited

U.S. PATENT DOCUMENTS

| | | | | |
|---|---|---|---|---|
| 5,238,223 A | * | 8/1993 | Mettner | .................... F15C 5/00 |
| | | | | 251/367 |
| 6,431,212 B1 | * | 8/2002 | Hayenga | ............. B01F 33/3011 |
| | | | | 417/322 |
| 6,619,311 B2 | * | 9/2003 | O'Connor | ........... F16K 99/0051 |
| | | | | 137/118.06 |

(Continued)

FOREIGN PATENT DOCUMENTS

| | | |
|---|---|---|
| CN | 103244734 A | 8/2013 |
| CN | 203925955 U | 11/2014 |

(Continued)

*Primary Examiner* — Matthew W Jellett
(74) *Attorney, Agent, or Firm* — IPro, PLLC

(57) ABSTRACT

A control valve structure, a using method thereof, a microfluidic chip, and a nucleic acid extraction device. The control valve structure includes: a cover plate layer, a first channel layer, a first adhesive layer, a second channel layer, at least one valve core, and at least one elastic film. When the valve core is embedded in the first limiting hole, the elastic film seals the first limiting hole, and the second limiting hole, the first through hole and the liquid outlet channel form a sample liquid flow channel; and when the valve core is embedded in the second limiting hole, the elastic film seals the second limiting hole so as to block the sample liquid flow channel.

20 Claims, 5 Drawing Sheets

(56) References Cited

U.S. PATENT DOCUMENTS

| | | | |
|---|---|---|---|
| 6,739,576 B2* | 5/2004 | O'Connor | F16K 99/0046 |
| | | | 251/30.02 |
| 6,786,708 B2* | 9/2004 | Brown | F04B 43/043 |
| | | | 251/129.15 |
| 7,025,324 B1* | 4/2006 | Slocum | F16K 99/0051 |
| | | | 251/231 |
| 9,389,231 B2* | 7/2016 | Edwards | B01L 3/502738 |
| 10,400,915 B2* | 9/2019 | Nath | F04D 15/0005 |
| 10,941,880 B2* | 3/2021 | Giusti | A61M 16/202 |
| 11,555,554 B2* | 1/2023 | Duqi | H10N 30/2047 |
| 2003/0183631 A1 | 10/2003 | Cross et al. | |
| 2010/0243078 A1* | 9/2010 | Yoo | F16K 99/0015 |
| | | | 251/65 |
| 2013/0199646 A1 | 8/2013 | Brammer et al. | |

FOREIGN PATENT DOCUMENTS

| | | |
|---|---|---|
| CN | 108636464 A | 10/2018 |
| CN | 111423969 A | 7/2020 |
| CN | 112774745 A | 5/2021 |

\* cited by examiner

CONTROL VALVE STRUCTURE, USING METHOD THEREOF, MICROFLUIDIC CHIP, AND NUCLEIC ACID EXTRACTION DEVICE

The present application is a National Stage of International Application No. PCT/CN2021/113108, filed on Aug. 17, 2021, which is incorporated in its entirety herein by reference.

FIELD

The present disclosure relates to the field of microfluidic technology, in particular to a control valve structure, a using method thereof, a microfluidic chip, and a nucleic acid extraction device.

BACKGROUND

The term "microfluidic chip" originated from the micro total analysis system (pTAS) proposed by Manz and Widmer in the 1990s. Professor Manz successfully applied MEMS technology to the field of analytical chemistry, and soon realized high-speed capillary electrophoresis on microchips, and his results were published in Science and other magazines. Since then, this field has received rapid attention from the academic circle, and has become one of the most cutting-edge scientific and technological fields in the world today. Lab on a chip and microfluidic chip are different names that people have put forward for this field. As the application of this subject has expanded from the initial analytical chemistry to many research and application fields, and as researchers have gained a deeper understanding of this subject, microfluidic chip has become a general term for this field.

SUMMARY

Embodiments of the present disclosure provide a control valve structure, a using method thereof, a microfluidic chip, and a nucleic acid extraction device. The specific solutions are as follows.

In one aspect, an embodiment of the present disclosure provides a control valve structure. The control valve structure includes: a cover plate layer, including at least one first limiting hole; a first channel layer opposite to the cover plate layer, provided with at least one second limiting hole at a position corresponding to the at least one first limiting hole; a first adhesive layer on a side, away from the cover plate layer, of the first channel layer, provided with at least one first through hole at a position corresponding to the at least one second limiting hole, wherein the at least one first through hole communicates with the at least one second limiting hole, respectively; a second channel layer on a side, away from the first channel layer, of the first adhesive layer, including a liquid outlet channel communicating with all the first through hole; at least one valve core, moving in a space defined by the first limiting hole and the second limiting hole disposed correspondingly; and at least one elastic film on a side, close to the at least one second limiting hole, of the at least one valve core, respectively; wherein when the valve core is at least partially in the first limiting hole, the first limiting hole is sealed by the elastic film so that the second limiting hole, the first through hole and the liquid outlet channel form a sample liquid flow channel; and when the valve core is at least partially in the second limiting hole, the second limiting hole is sealed by the elastic film so as to block the sample liquid flow channel.

In some embodiments, in the above control valve structure provided by the embodiment of the present disclosure, an area of an orthographic projection of the first limiting hole on a plane where the first channel layer is located is substantially the same as an area of an orthographic projection of the second limiting hole on the plane where the first channel layer is located.

In some embodiments, in the above control valve structure provided by the embodiment of the present disclosure, an area of an orthographic projection of the valve core on the plane where the first channel layer is located is substantially the same as the area of the orthographic projection of the second limiting hole on the plane where the first channel layer is located.

In some embodiments, in the above control valve structure provided by the embodiment of the present disclosure, an area of an orthographic projection of the first through holes on a plane where the first channel layer is located is smaller than an area of an orthographic projection of the second limiting hole on the plane where the first channel layer is located.

In some embodiments, in the above control valve structure provided by the embodiment of the present disclosure, the cover plate layer further includes at least one first sample injection port, and the first sample injection port is located on the same side of a region where all the first limiting hole is located; and the first channel layer further includes at least one second through hole communicating with the at least one first sample injection port, and at least one first liquid inlet channel communicating with the at least one second through hole and the at least one second limiting hole.

In some embodiments, in the above control valve structure provided by the embodiment of the present disclosure, the cover plate layer further includes a second sample injection port, and the second sample injection port is on an opposite side of the at least one first sample injection port in the region where all the first limiting hole is located; the first channel layer further includes a third through hole communicating with the second sample injection port; the first adhesive layer further includes a fourth through hole communicating with the third through hole, and a fifth through hole between a region where the fourth through hole is located and a region where all the first through hole is located, wherein the fifth through hole and a first through hole adjacent to the fifth through hole are covered by the same second limiting hole; and the second channel layer further includes a second liquid inlet channel communicating with the fourth through hole and the fifth through hole.

In some embodiments, in the above control valve structure provided by the embodiment of the present disclosure, a distance between the fifth through hole and the first through hole adjacent to the fifth through hole ranges from ranges from 1 mm to 3 mm.

In some embodiments, in the above control valve structure provided by the embodiment of the present disclosure, the fifth through hole and the first through hole are cylindrical holes, and diameters of the fifth through hole and the first through holes range from 0.5 mm to 2 mm.

In some embodiments, in the above control valve structure provided by the embodiment of the present disclosure, the first adhesive layer includes a lower adhesive layer, a release film and an upper adhesive layer disposed in a laminated mode; the lower adhesive layer is bonded to the second channel layer in a contacting mode, and the upper adhesive layer is bonded to the first channel layer in a contacting mode; the lower adhesive layer includes a first via hole, a second via hole and a third via hole, the release film includes a fourth via hole, a fifth via hole and a sixth via hole, and the upper adhesive layer includes a seventh via hole, an eighth via hole and a ninth via hole; the first via hole, the fourth via hole and the seventh via hole communicate with one another to form the first through hole; the second via hole, the fifth via hole and the eighth via hole communicate with one another to form the fourth through hole; and the third via hole, the sixth via hole and the ninth via hole communicate with one another to form the fifth through hole.

In some embodiments, in the above control valve structure provided by the embodiment of the present disclosure, the release film further includes a tenth via hole, the lower adhesive layer further includes an eleventh via hole, the tenth via hole and the eleventh via hole communicate with each other, and an orthographic projection of the tenth via hole on a plane where the first channel layer is located and an orthographic projection of the eleventh via hole on the plane where the first channel layer is located each substantially overlap an orthographic projection of the second limiting hole on the plane where the first channel layer is located.

In some embodiments, the above control valve structure provided by the embodiment of the present disclosure further includes: a second adhesive layer, configured to bond the cover plate layer and the first channel layer, wherein the second adhesive layer includes at least one twelfth via hole communicating with the at least one first sample injection port and the at least one second through hole, a thirteenth via hole communicating with the second sample injection port and the third through hole, and at least one accommodating hole for accommodating the at least one elastic film.

In some embodiments, in the above control valve structure provided by the embodiment of the present disclosure, a thickness of the second adhesive layer is substantially equal to a thickness of the elastic film in a direction perpendicular to a plane where the first channel layer is located.

In some embodiments, in the above control valve structure provided by the embodiment of the present disclosure, the cover plate layer includes at least one groove surrounding the at least one first limiting hole, and an orthographic projection of each of the at least one groove on a plane where the first channel layer is located overlaps an orthographic projection of a corresponding elastic film on the plane where the first channel layer is located.

In some embodiments, in the above control valve structure provided by the embodiment of the present disclosure, each of the at least one groove includes a first groove and/or a second groove, the first groove is in a side, away from the first channel layer, of the cover plate layer, the second groove is in a side, facing the first channel layer, of the cover plate layer, an area of an orthographic projection of the first groove on the plane where the first channel layer is located is substantially the same as an area of the orthographic projection of the corresponding elastic film on the plane where the first channel layer is located, and an orthographic projection of the second groove on the plane where the first channel layer is located is located within the orthographic projection of the corresponding elastic film on the plane where the first channel layer is located.

In some embodiments, in the above control valve structure provided by the embodiment of the present disclosure, a distance between a boundary of the orthographic projection of the second groove on the plane where the first channel layer is located and a boundary of the orthographic projection of the corresponding elastic film on the plane where the first channel layer is located ranges from 0.5 mm to 1.0 mm.

In some embodiments, in the above control valve structure provided by the embodiment of the present disclosure, in the direction perpendicular to the plane where the first channel layer is located, a depth of the first groove ranges from 0.8 mm to 1.2 mm, and a depth of the second groove ranges from 10 μm to 50 μm.

In some embodiments, the above control valve structure provided by the embodiment of the present disclosure further includes a protective film on a side, away from the first channel layer, of the cover plate layer, the protective film corresponds to the second groove, and the orthographic projection of the second groove on the plane where the first channel layer is located is within an orthographic projection of the corresponding protective film on the plane where the first channel layer is located.

In another aspect, an embodiment of the present disclosure provides a using method of the above control valve structure. The using method includes: controlling the valve core to be at least partially located in the first limiting hole, so that the elastic film seals the first limiting hole, and sample liquid is injected into the liquid outlet channel from second limiting holes via first through holes; and controlling the valve core to be at least partially located in the second limiting hole, so that the elastic film seals the second limiting hole to prevent the sample liquid from being injected into the liquid outlet channel from the second limiting hole via the first through hole.

In some embodiments, the above using method provided by the embodiment of the present disclosure further includes: while controlling the valve core to be at least partially located in the first limiting hole, the method further includes: injecting sample liquid into the second limiting hole through a first sample injection port, a second through hole and a first liquid inlet channel communicating with one another.

In some embodiments, the above using method provided by the embodiment of the present disclosure further includes: while controlling the valve core to be at least partially located in the first limiting hole, the method further includes: injecting sample liquid into the second limiting hole through a second sample injection port, a third through hole, a fourth through hole, a second liquid inlet channel and a fifth through hole communicating with one another.

In another aspect, an embodiment of the present disclosure provides a microfluidic chip. The microfluidic chip includes the above control valve structure provided by the embodiment of the present disclosure.

In another aspect, an embodiment of the present disclosure provides a nucleic acid extraction device. The nucleic acid extraction device includes a microfluidic chip and an electromagnet, wherein, the microfluidic chip is the microfluidic chip according to the above embodiments, and the electromagnet is on a side, away from the cover plate layer, of the second channel layer.

DETAILED DESCRIPTION OF THE EMBODIMENTS

Figure 1:
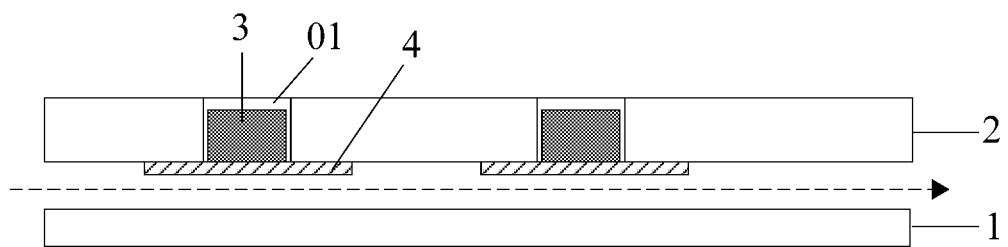
FIG. 1 is a schematic diagram of a control valve structure in the related art in an open state.

In order to make the objectives, technical solutions and advantages of embodiments of the present disclosure clearer, the technical solutions of the embodiments of the present disclosure will be clearly and completely described below in conjunction with the accompanying drawings of the embodiments of the present disclosure. It needs to be noted that the sizes and shapes of all figures in the accompanying drawings do not reflect true scales, and are only intended to schematically illustrate the content of the present disclosure. The same or similar reference numerals represent the same or similar elements or elements with the same or similar functions throughout.

Unless otherwise defined, technical or scientific terms used herein shall have the ordinary meanings understood by those ordinarily skilled in the art to which the present disclosure pertains. The words "first", "second" and the like used in the specification and claims of the present disclosure do not indicate any order, quantity or importance, but are only configured to distinguish different components. The words "comprise" or "include" and the like indicate that an element or item appearing before the word covers listed elements or items appearing after the word and equivalents thereof, and does not exclude other elements or items. "Inner", "outer", "upper" and "lower" and the like are only used to represent relative position relationships, and the relative position relationships may also change accordingly after an absolute position of a described object is changed.

Figure 2:
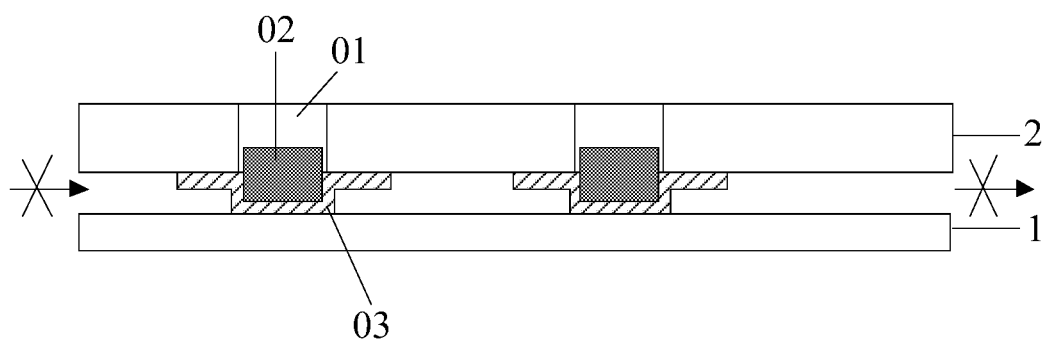
FIG. 2 is a schematic diagram of a control valve structure in the related art in a closed state.

FIG. 1 and FIG. 2 are schematic diagrams of a control valve structure in the related art. The control valve structure specifically includes a channel plate 1, a cover plate 2, iron blocks 3, and elastic protective films 4. The cover plate 2 has accommodating grooves 01 for accommodating the iron blocks 3. When a control valve is opened, the iron blocks 3 are not affected by magnetic force, and are completely located in the accommodating grooves 01, so that sample liquid may pass through unhindered, as shown in FIG. 1. When the control valve is closed, the iron blocks 3 are subjected to downward magnetic force, the iron blocks 3 in the accommodating grooves 01 are attracted downward, and the elastic protective films 4 are bent downwards and deformed under pressure to block flow of the sample liquid, as shown in FIG. 2. However, the iron blocks 3 are prone to shifting while being attracted downward, causing loose closure of the control valve, and resulting in liquid leakage.

Figure 3:
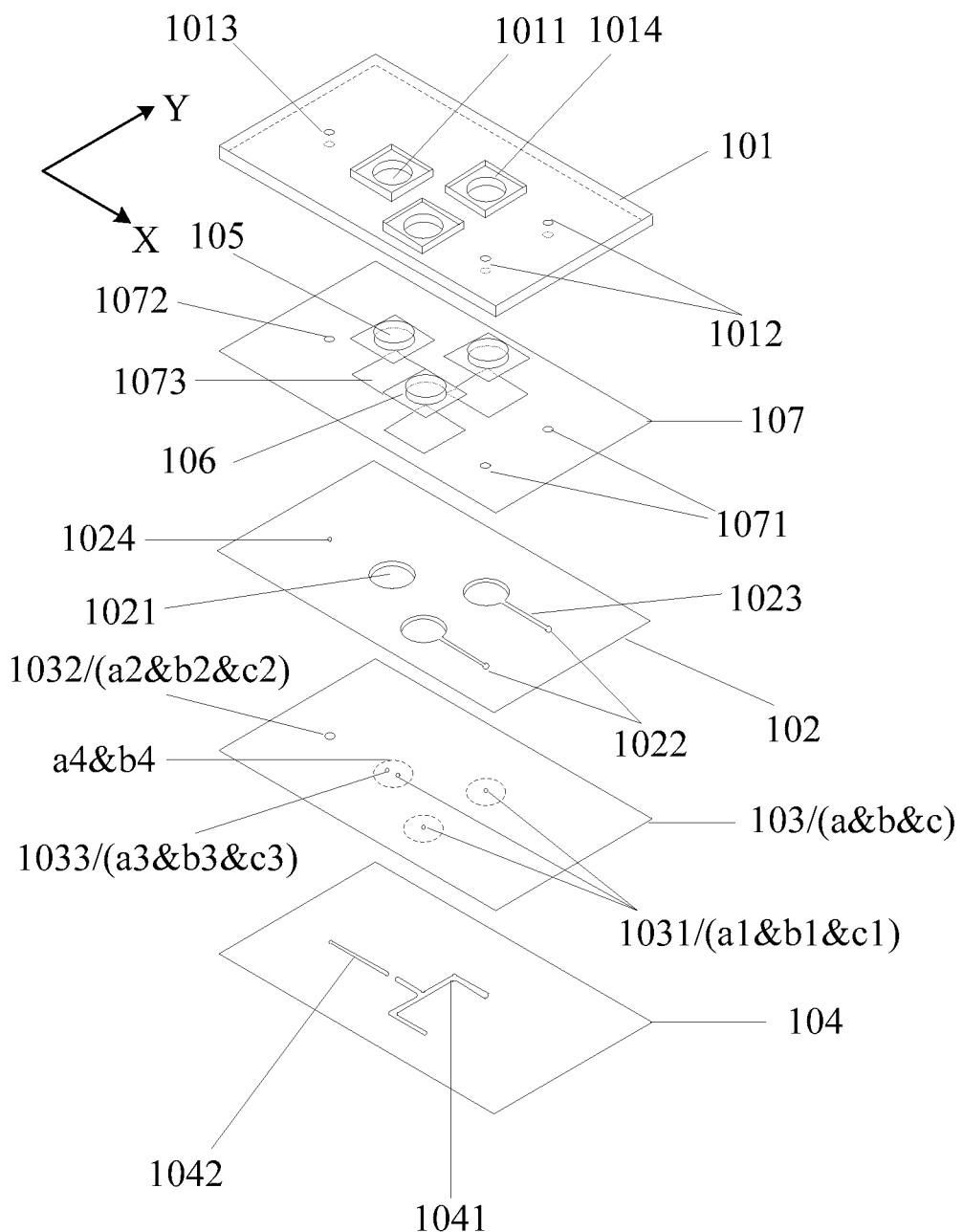
FIG. 3 is a schematic diagram of a laminated structure of a control valve structure provided by an embodiment of the present disclosure.
Figure 4:
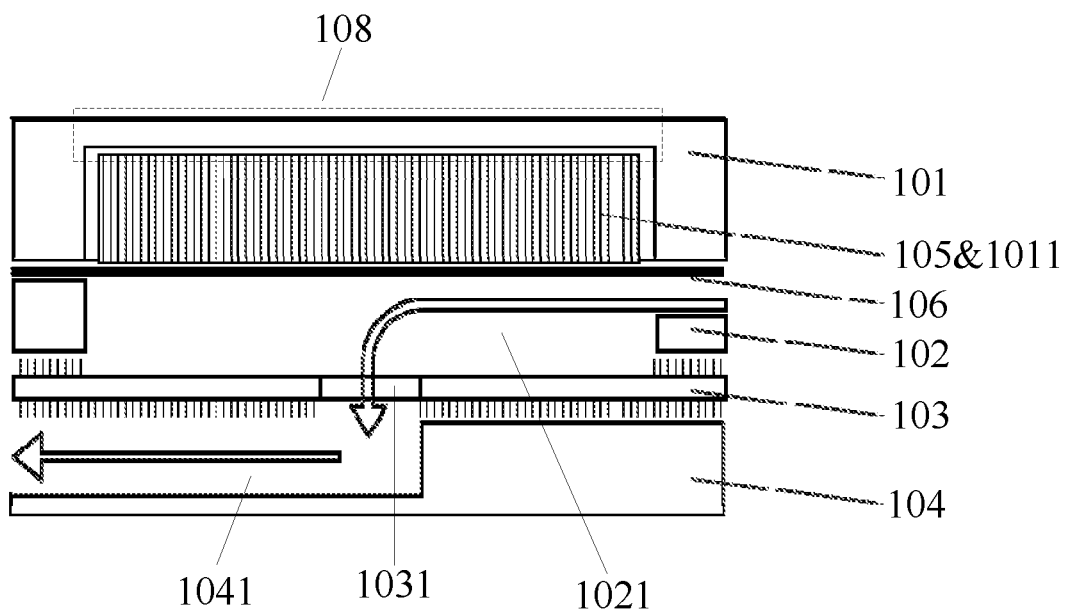
FIG. 4 is a schematic diagram of a control valve structure provided by an embodiment of the present disclosure in an open state.
Figure 5:
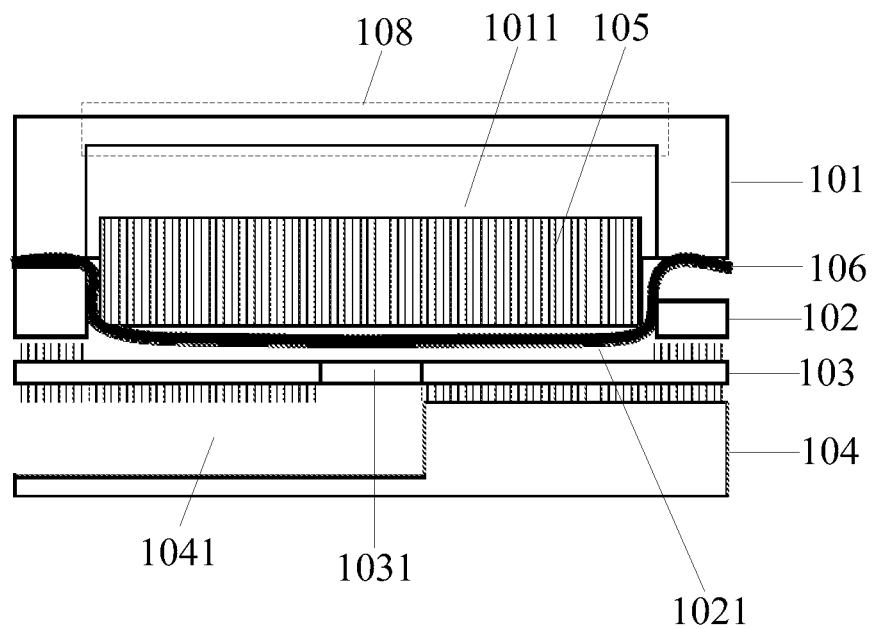
FIG. 5 is a schematic diagram of a control valve structure provided by an embodiment of the present disclosure in a closed state.

In order to at least solve the above technical problems in the related art, an embodiment of the present disclosure provides a control valve structure. As shown in FIG. 3 to FIG. 5, the control valve structure includes: a cover plate layer 101, a first channel layer 102, a first adhesive layer 103, a second channel layer 104, at least one valve core 105 and at least one elastic film 106.

The cover plate layer 101 includes at least one first limiting hole 1011. The first channel layer 102 is opposite to the cover plate layer 101, and is provided with at least one second limiting hole 1021 at a position corresponding to the at least one first limiting hole 1011. The first adhesive layer 103 is on a side, away from the cover plate layer 101, of the first channel layer 102, and is provided with at least one first through hole 1031 at a position corresponding to the at least one second limiting hole 1021, wherein the at least one first through hole 1031 communicates with the at least one second limiting hole 1021, respectively. The second channel layer 104 is on a side, away from the first channel layer 102, of the first adhesive layer 103, and includes a liquid outlet channel 1041 communicating with all the first through hole(s) 1031. The at least one valve core 105 moves in a space defined by the at least one first limiting hole 1011 and the at least one second limiting hole 1021 disposed correspondingly, respectively. The at least one elastic film 106 is on a side, close to the at least one second limiting hole 1021, of the at least one valve core 105, respectively. When the valve core 105 is at least partially (namely a part or all of the valve core 105) in the first limiting hole 1011, the first limiting hole 1011 is sealed by the elastic film 106 so that the second limiting hole 1021, the first through hole 1031 and the liquid outlet channel 1041 form a sample liquid flow channel. When the valve core 105 is at least partially (namely a part or all of the valve core 105) is in the second limiting hole 1021, the second limiting hole 1021 is sealed by the elastic film 106 so as to block the sample liquid flow channel.

In the above control valve structure provided by the embodiment of the present disclosure, a movement space of the valve core 105 is jointly defined by the first limiting hole 1011 in the cover plate layer 101 and the second limiting hole 1021 in the first channel layer 102, and the first through hole 1031 and the liquid outlet channel 1041 communicating with the second limiting hole 1021 are provided below the second limiting hole 1021 to form the sample liquid flow channel, so that an inlet and outlet of the sample liquid flow channel and a valve control space are not on the same layer. Thus, when a control valve is closed, the valve core 105 is at least partially (namely a part or all of the valve core 105) in the second limiting hole 1021 without shifting, and the elastic film 106 seals the second limiting hole 1021 to block the sample liquid flow channel, thereby greatly reducing liquid leakage. In addition, when the control valve is opened, the valve core 105 is partially or wholly in the first limiting hole 1011, the elastic film 106 seals the first limiting hole 1011, and the second limiting hole 1021, the first through hole 1031 and the liquid outlet channel 1041 form the sample liquid flow channel, ensuring normal flow of sample liquid.

It should be noted that in the present disclosure, in order to reduce the pressure of the valve core 105 on the elastic film 106 to facilitate normal reset of the elastic film 106, a small and light valve core 105, such as a steel column, may be selected. In addition, since the small and light valve core 105 may not cause deformation of the elastic film 106, the valve core 105 may be completely in the first limiting hole 1011 and may also be partially located in the first limiting hole 1011 (that is, the valve core 105 may protrude out of the first limiting hole 1011) when the control valve is opened. In addition, when the control valve is closed, the valve core 105 presses down the elastic film 106 as long as the elastic film 106 may seal the second limiting hole 1021. Thus, the valve core 105 may be partially in the second limiting hole 1021 (as shown in FIG. 5), and may also be completely in the second limiting hole 1021. Optionally, in a direction perpendicular to a plane where the first channel layer 102 is located, a height of the valve core 105 may range from 1 mm to 3 mm.

In some embodiments, in the above control valve structure provided by the embodiment of the present disclosure, in order to ensure a limiting effect of the first limiting hole 1011 and the second limiting hole 1021 on the valve core 105, as shown in FIG. 3 to FIG. 5, an area of an orthographic projection of the first limiting hole 1011 on the plane where the first channel layer 102 is located may be substantially the same as an area of an orthographic projection of the second limiting hole 1021 on the plane where the first channel layer 102 is located.

It should be noted that in the above control valve structure provided by the embodiment of the present disclosure, due to the limitation of process conditions or the influence of other factors such as measurement, "substantially" may be exactly the same, or there may be some deviations, so that as long as an "approximate" relationship between features meets an allowable error (for example, +/−10%), it falls within the protection scope of the present disclosure.

In some embodiments, in the above control valve structure provided by the embodiment of the present disclosure, as shown in FIG. 3 to FIG. 5, an area of an orthographic projection of the valve core 105 on the plane where the first channel layer 102 is located may be substantially the same as the area of the orthographic projection of the second limiting hole 1021 on the plane where the first channel layer 102 is located, so as to ensure that the valve core 105 may pass through the second limiting hole 1021 and the first limiting hole 1011 with a similar size to the second limiting hole 1021. In addition, since a size of the valve core 105 is similar to that of the second limiting hole 1021, the valve core 105 may be effectively prevented from shifting when moving in the first limiting hole 1011 and the second limiting hole 1021.

In some embodiments, the valve core 105 may be a steel column, and the first limiting hole 1011 and the second limiting hole 1021 may be a cylindrical hole. In this case, diameters of the valve core 105, the first limiting hole 1011 and the second limiting hole 1021 may range from 5 mm to 8 mm.

In some embodiments, in the above control valve structure provided by the embodiment of the present disclosure, as shown in FIG. 3 to FIG. 5, an area of an orthographic projection of the first through hole 1031 in the first adhesive layer 103 on the plane where the first channel layer 102 is located is smaller than the area of the orthographic projection of the second limiting hole 1021 on the plane where the first channel layer 102 is located. In this way, when the valve core 105 is attracted downward by magnetic force to press the second limiting hole 1021, the deformed elastic film 106 may be supported by the first adhesive layer 103, so that the elastic film 106 may effectively block the sample liquid flow channel, and the effect of preventing liquid leakage is improved.

In some embodiments, in the above control valve structure provided by the embodiment of the present disclosure, as shown in FIG. 3 to FIG. 5, the cover plate layer 101 may further include at least one first sample injection port 1012, and the first sample injection port 1012 is located on the same side of a region where all the first limiting hole(s) 1011 is located. In some embodiments, the position of the first sample injection port 1012 may be selected according to the size of space around the region where the first limiting hole 1011 is located in the cover plate layer 101. For example, as shown in FIG. 3, when space on two sides of the first limiting hole 1011 in the X direction is relatively large, and space on two sides of the first limiting hole in the Y direction is relatively small, the first sample injection port 1012 may be provided on one side of the first limiting hole 1011 in the X direction (for example, the right side as shown in FIG. 3) for convenience of processing.

The first channel layer 102 may further include at least one second through hole 1022 communicating with the at least one first sample injection port 1012, and at least one first liquid inlet channel 1023 communicating with the at least one second through hole 1022 and the at least one second limiting hole 1021.

In a specific implementation, after the sample liquid is injected from the first sample injection port 1012, the sample liquid flows through the second through hole 1022 and the first liquid inlet channel 1023 in sequence, and then reaches the second limiting hole 1021. When the control valve is opened, the valve core 105 is at least partially located in the first limiting hole 1011, the elastic film 106 seals the first limiting hole 1011, and the sample liquid at the second limiting hole 1021 is injected into the liquid outlet channel 1041 via the first through hole 1031 and then flows out. When the control valve is closed, the valve core 105 is at least partially located in the second limiting hole 1021, the elastic film 106 seals the second limiting hole 1021, and the sample liquid at the second limiting hole 1021 may not flow. In this case, the control valve is a top-in and bottom-out valve.

Figure 6:
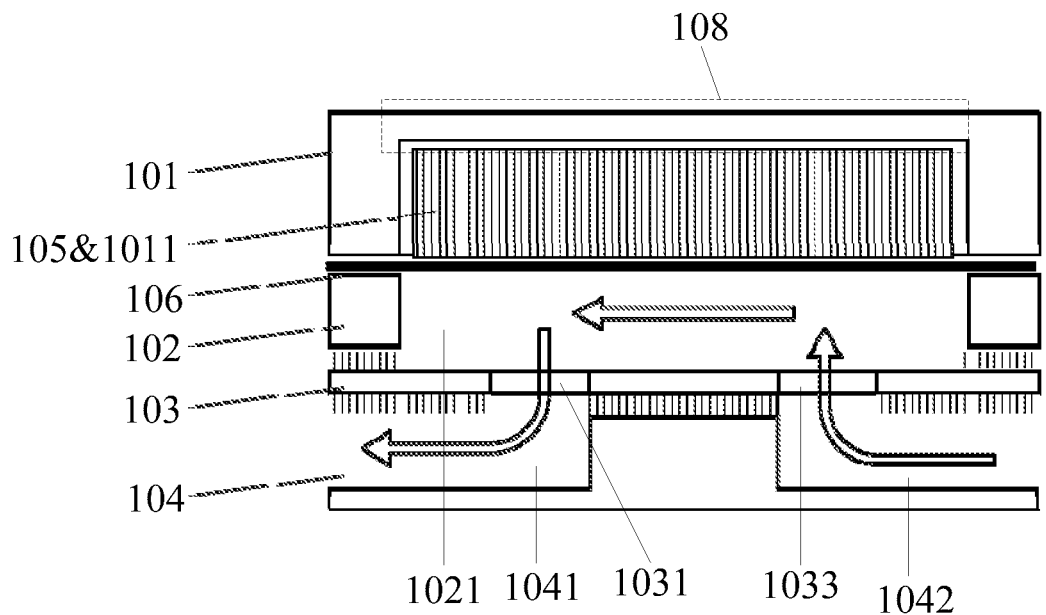
FIG. 6 is another schematic diagram of a control valve structure provided by an embodiment of the present disclosure in an open state.
Figure 7:
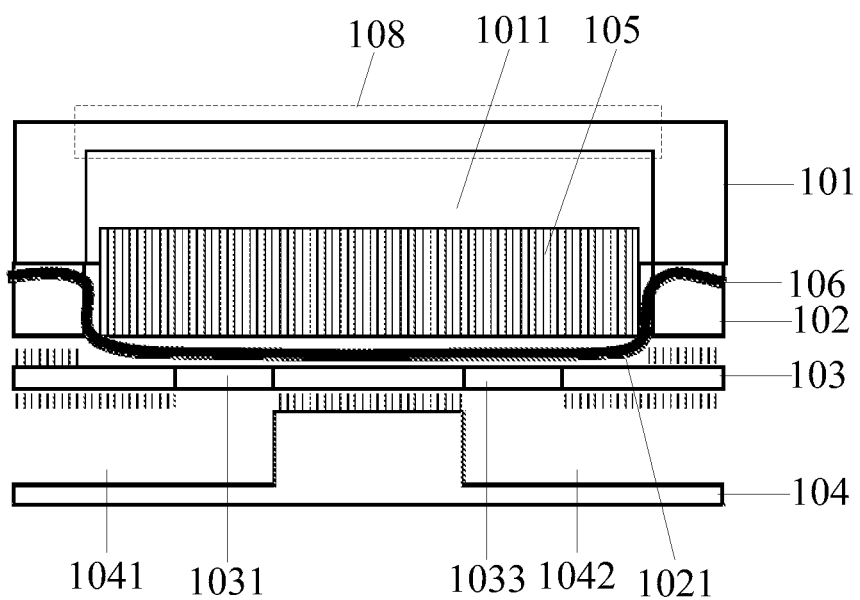
FIG. 7 is another schematic diagram of a control valve structure provided by an embodiment of the present disclosure in a closed state.

In some embodiments, in the above control valve structure provided by the embodiment of the present disclosure, as shown in FIG. 3, FIG. 6 and FIG. 7, the cover plate layer 101 may further include a second sample injection port 1013, and the second sample injection port 1013 is located on the opposite side of the at least one first sample injection port 1012 in the region where all first limiting hole(s) 1011 is located.

The first channel layer 102 may further include a third through hole 1024 communicating with the second sample injection port 1013.

The first adhesive layer 103 may further include a fourth through hole 1032 communicating with the third through hole 1024, and a fifth through hole 1033 located between a region where the fourth through hole 1032 is located and a region where all the first through hole(s) 1031 is located. The fifth through hole 1033 and a first through hole 1031 adjacent to the fifth through hole 1033 are covered by the same second limiting hole 1021.

The second channel layer 104 may further include a second liquid inlet channel 1042 communicating with the fourth through hole 1032 and the fifth through hole 1033.

In a specific implementation, after the sample liquid is injected from the second sample injection port 1013, the sample liquid flows through the third through hole 1024, the fourth through hole 1032, the second liquid inlet channel 1042 and the fifth through hole 1033 in sequence, and then reaches the at least one second limiting hole 1021. When the control valve is opened, the valve core 105 is at least partially located in the first limiting hole 1011, the elastic film 106 seals the first limiting hole 1011, and the sample liquid at the second limiting hole 1021 is injected into the liquid outlet channel 1041 via the first through hole 1031 and then flows out. When the control valve is closed, the valve core 105 is at least partially located in the second limiting hole 1021, the elastic film 106 seals the second limiting hole 1021, and the sample liquid at the second limiting hole 1021 may not flow. In this case, the control valve is a bottom-in and bottom-out valve.

In some embodiments, in the above control valve structure provided by the embodiment of the present disclosure, a distance between the fifth through hole 1033 and the adjacent first through hole 1031 may range from 1 mm to 3 mm to ensure that the fifth through hole 1033 and the adjacent first through hole 1031 may be covered by the same second limiting hole 1021. Thus, the sample liquid may flow in from the fifth through hole 1033 and flow out from the adjacent first through hole 1031, as shown in FIG. 6.

In some embodiments, in the above control valve structure provided by the embodiment of the present disclosure, the fifth through hole 1033 and the first through hole 1031 are cylindrical holes, and diameters of the fifth through hole 1033 and the first through hole 1031 may range from 0.5 mm to 2 mm to ensure that the fifth through hole 1033 and the adjacent first through hole 1031 may be covered by the same second limiting hole 1021. Thus, the sample liquid may flow into the fifth through hole 1033 and flow out from the adjacent first through hole 1031, as shown in FIG. 6.

In some embodiments, in the above control valve structure provided by the embodiment of the present disclosure, as shown in FIG. 3, the first adhesive layer 103 may include a lower adhesive layer a, a release film b and an upper adhesive layer c disposed in a laminated mode. The lower adhesive layer a is bonded to the second channel layer 104 in a contacting mode, and the upper adhesive layer c is bonded to the first channel layer 102 in a contacting mode. The lower adhesive layer a includes a first via hole a1, a second via hole a2 and a third via hole a3, the release film b includes a fourth via hole b1, a fifth via hole b2 and a sixth via hole b3, and the upper adhesive layer c includes a seventh via hole c1, an eighth via hole c2 and a ninth via hole c3. The first via hole a1, the fourth via hole b1 and the seventh via hole c1 communicate with one another to form the first through hole 1031. The second via hole a2, the fifth via hole b2 and the eighth via hole c2 communicate with one another to form the fourth through hole 1032. The third via hole a3, the sixth via hole b3 and the ninth via hole c3 communicate with one another to form the fifth through hole 1033.

In some embodiments, in the above control valve structure provided by the embodiment of the present disclosure, as shown in FIG. 3, the release film b may further include a tenth via hole b4, the lower adhesive layer a may further include an eleventh via hole a4, the tenth via hole b4 and the eleventh via hole a4 communicate with each other, and an orthographic projection of the tenth via hole b4 on the plane where the first channel layer 102 is located and an orthographic projection of the eleventh via hole a4 on the plane where the first channel layer 102 is located substantially each overlap the orthographic projection of the second limiting hole 1021 on the plane where the first channel layer 102 is located. Through the above arrangement, the first adhesive layer 103 under the second limiting hole 1021 only includes the upper adhesive layer c, so that the thickness is small, and flow resistance of the first adhesive layer 103 to the sample liquid may be reduced.

Optionally, the first adhesive layer 103 may be processed by using conventional double-sided adhesive tape, and the conventional double-sided adhesive tape includes an upper release film, an adhesive layer and a lower release film. In a specific implementation, the first adhesive layer 103 may be prepared by using two layers of conventional double-sided adhesive tape, which are referred to as a first layer of conventional double-sided adhesive tape and a second layer of conventional double-sided adhesive tape, respectively. Specifically, the first layer of conventional double-sided adhesive tape may be cut semi-through (that is, only the upper release film and the adhesive layer are cut off, and the lower release film is retained) at the position of the first limiting hole 1011, and is completely cut through at the positions of the first through hole 1031, the fourth through hole 1032 and the fifth through hole 1033 (that is, the upper release film, the adhesive layer and the lower release film are completely cut off), and the second layer of conventional double-sided adhesive tape is completely cut through at the positions of the first through holes 1031, the fourth through hole 1032 and the fifth through hole 1033. When in use, the upper release film of the second layer of conventional double-sided tape is peeled off and sticked to a bottom of the first layer of conventional double-sided tape, then the upper release film of the first layer of conventional double-sided tape is peeled off and sticked to a bottom of the first channel layer 104, and then the lower release film of the second layer of conventional double-sided tape is peeled off to allow the second channel layer 104 to be sticked thereon, so that the adhesive layer of the first layer of conventional double-sided adhesive tape, the lower release film of the first layer of conventional double-sided adhesive tape and the adhesive layer of the second layer of conventional double-sided adhesive tape form the first adhesive layer 103 jointly.

In some embodiments, the above control valve structure provided by the embodiment of the present disclosure, as shown in FIG. 3, may further include: a second adhesive layer 107 for bonding the cover plate layer 101 and the first channel layer 102. The second adhesive layer 107 includes at least one twelfth through hole 1071 communicating with the first sample injection port 1012 and the second through hole 1022, a thirteenth through hole 1072 communicating with the second sample injection port 1013 and the third through hole 1024, and at least one accommodating hole 1073 for accommodating the at least one elastic film 106. The accommodating hole 1073 may ensure that the valve core 105 move freely in the space defined by the first limiting hole 1011 and the second limiting hole 1021. The twelfth via hole 1071 may ensure that the sample liquid injected from the first sample injection port 1012 smoothly flows into the second limiting hole 1021. The thirteenth via hole 1072 may ensure that the sample liquid injected from the second sample injection port 1013 smoothly flows into the second limiting hole 1021.

In some embodiments, in the above control valve structure provided by the embodiment of the present disclosure, a thickness of the second adhesive layer 107 is substantially equal to a thickness of the elastic film 106 in the direction perpendicular to the plane where first channel layer 102 is located. Thus, there is almost no height difference between the second adhesive layer 107 and the elastic films 106, so as to ensure that there is no gap between the second adhesive layer 107 and the elastic films 106 and avoid liquid leakage.

In addition, it is worth noting that, in order to facilitate processing, facilitate mass production and improve yield, each of the cover plate layer 101, the first channel layer 102, the first adhesive layer 103 and the second channel layer 104 has desirable thickness uniformity.

In some embodiments, in the above control valve structure provided by the embodiment of the present disclosure, as shown in FIG. 3, the cover plate layer 101 may include at least one groove 1014 surrounding the at least one first limiting hole 1011, and an orthographic projection of each groove 1014 on the plane where the first channel layer 102 is located overlaps an orthographic projection of the corresponding elastic film 106 on the plane where the first channel layer 102 is located. With the groove 1014, a gas space around the valve core 105 may be increased, and air pressure change around the valve core 105 may be reduced, so that the stability of the control valve may be improved.

In some embodiments, in the above control valve structure provided by the embodiment of the present disclosure, in order to increase the gas space around the valve core 105 as much as possible to further improve the stability of the control valve, each groove 1014 may include a first groove and/or a second groove. The first groove is located in a side, away from the first channel layer 102, of the cover plate layer 101. The second groove is located on a side, facing the first channel layer 102, of the cover plate layer 101. An area of an orthographic projection of each first groove on the plane where the first channel layer 102 is located is substantially the same as an area of the orthographic projection of the corresponding elastic film 106 on the plane where the first channel layer 102 is located. An orthographic projection of each second groove on the plane where the first channel layer 102 is located is located within the orthographic projection of the corresponding elastic film 106 on the plane where the first channel layer 102 is located.

In some embodiments, in the above control valve structure provided by the embodiment of the present disclosure, a distance between a boundary of the orthographic projection of each second groove on the plane where the first channel layer 102 is located and a boundary of the orthographic projection of the corresponding elastic film 106 on the plane where the first channel layer 102 is located ranges from 0.5 mm to 1.0 mm, so as to ensure an edge pressing effect of the elastic films 106 on the second grooves.

In some embodiments, in the above control valve structure provided by the embodiment of the present disclosure, in order to improve the stability of the control valve, in the direction perpendicular to the plane where the first channel layer 102 is located, a depth of the first groove may range from 0.8 mm to 1.2 mm, and a depth of the second groove may range from 10 μm to 50 μm.

In some embodiments, as shown in FIG. 4 to FIG. 7, the above control valve structure provided by the embodiment of the present disclosure may further include a protective film 108 on the side, away from the first channel layer 102, of the cover plate layer 101. The protective film 108 corresponds to the second groove. The orthographic projection of each second groove on the plane where the first channel layer 102 is located is located within an orthographic projection of the corresponding protective film 108 on the plane where the first channel layer 102 is located. Thus, the second groove and the first limiting hole 1011 surrounded by the second groove may be sealed through the protective film 108, and the valve core 105 is prevented from falling out of the first limiting hole 1011.

Based on the same inventive concept, an embodiment of the present disclosure provides a using method of the above control valve structure. Since the principle of solving the problem by the using method is similar to the principle of solving the problem by the above control valve structure, the implementation of the using method provided by the embodiment of the present disclosure may refer to the implementation of the above control valve structure provided by the embodiment of the present disclosure, which will not be repeated.

Figure 8:
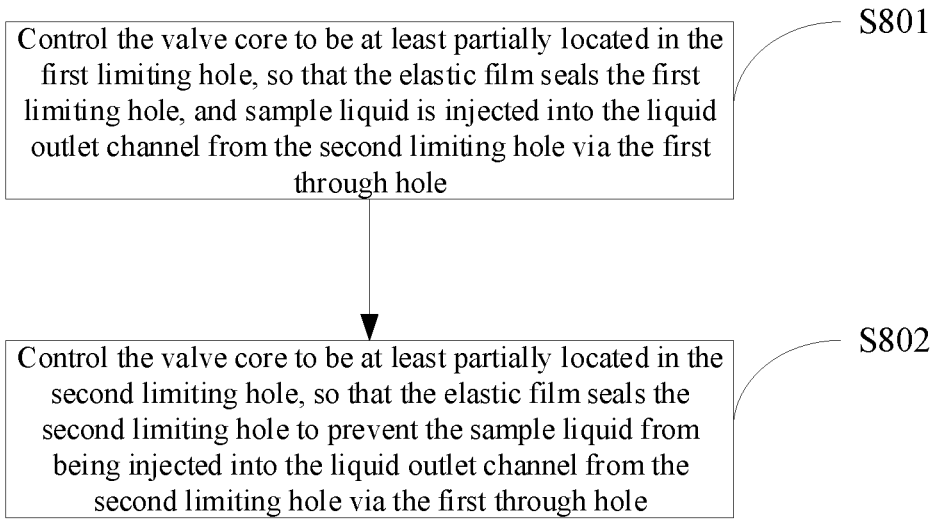
FIG. 8 is a flow diagram of a using method of a control valve structure provided by an embodiment of the present disclosure.

Specifically, the embodiment of the present disclosure provides the using method of the above control valve structure. As shown in FIG. 8, the using method may include the following steps.

S801, at least one valve core is controlled to be at least partially located in at least one first limiting hole, respectively, so that at least one elastic film seals the at least one first limiting hole, and sample liquid is injected into a liquid outlet channel from at least one second limiting hole via the at least one first through hole.

S802, the valve core is controlled to be at least partially located in the second limiting hole, so that the elastic film seals the second limiting hole to prevent the sample liquid from being injected into the liquid outlet channel from the second limiting hole via the first through hole.

In some embodiments, in the above using method provided by the embodiment of the present disclosure, while step S801 is executed, that is, while the valve core is controlled to be at least partially located in the first limiting hole, the following step may also be executed: sample liquid is injected into the second limiting hole through a first sample injection port, a second through hole and a first liquid inlet channel communicating with one another.

In some embodiments, in the above using method provided by the embodiment of the present disclosure, while step S801 is executed, that is, while the valve cores are controlled to be at least partially located in the first limiting holes, the following step may also be executed.

Sample liquid is injected into the second limiting holes through a second sample injection port, a third through hole, a fourth through hole, a second liquid inlet channel and a fifth through hole communicating with one another.

Based on the same inventive concept, an embodiment of the present disclosure provides a microfluidic chip. The microfluidic chip includes the above control valve structure provided by the embodiment of the present disclosure. Since the principle of solving the problem by the microfluidic chip is similar to the principle of solving the problem by the above control valve structure, the implementation of the microfluidic chip provided by the embodiment of the present disclosure may refer to the implementation of the above control valve structure provided by the embodiment of the present disclosure, which will not be repeated.

Figure 9:
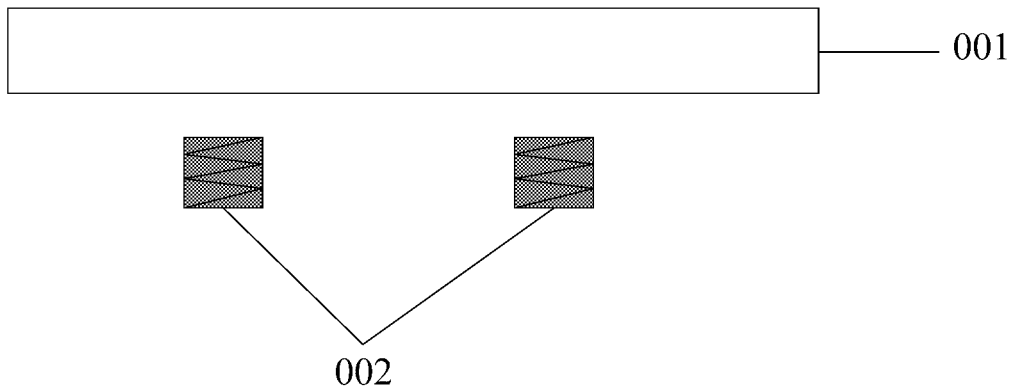
FIG. 9 is a schematic structural diagram of a nucleic acid extraction device provided by an embodiment of the present disclosure.

In another aspect, an embodiment of the present disclosure provides a nucleic acid extraction device. As shown in FIG. 9, the nucleic acid extraction device includes a microfluidic chip 001 and at least one electromagnet 002. The microfluidic chip 001 is the above microfluidic chip provided by the embodiment of the present disclosure. The electromagnet 002 is located on a side, away from a cover plate layer 101, of a second channel layer 104.

In some embodiments, one electromagnet 002 may be correspondingly disposed under each valve core 105, so as to realize independent control over each valve core 105 through the corresponding electromagnet 002. Specifically, the valve core 105 may be limited in the second limiting hole 1021 by controlling the electromagnet 002 to be energized forwards; and the valve core 105 may be limited in the first limiting hole 1011 by controlling the electromagnet 002 to be powered off or reversely energized.

It is apparent that those skilled in the art can make various modifications and variations to the embodiments of the present disclosure without departing from the spirit and scope of the embodiments of the present disclosure. Thus, provided that these modifications and variations of the embodiments of the present disclosure fall within the scope of the claims of the present disclosure and their equivalents, the present disclosure is also intended to cover such modifications and variations.

What is claimed is:

1. A control valve structure, comprising:
a cover plate layer, comprising at least one first limiting hole;
a first channel layer opposite to the cover plate layer, provided with at least one second limiting hole at a position corresponding to the at least one first limiting hole;
a first adhesive layer on a side, away from the cover plate layer, of the first channel layer, provided with at least one first through hole at a position corresponding to the at least one second limiting hole, wherein the at least one first through hole communicates with the at least one second limiting hole, respectively;
a second channel layer on a side, away from the first channel layer, of the first adhesive layer, comprising a liquid outlet channel communicating with the at least one first through hole;
at least one valve core, moving in a space defined by the at least one first limiting hole and the at least one second limiting hole disposed correspondingly; and
at least one elastic film on a side, close to the at least one second limiting hole, of the at least one valve core, respectively; wherein when the at least one valve core is at least partially in the at least one first limiting hole, the at least one first limiting hole is sealed by the at least one elastic film so that the at least one second limiting hole, the at least one first through hole and the liquid outlet channel form a sample liquid flow channel; and when the at least one valve core is at least partially in the at least one second limiting hole, the at least one second limiting hole is sealed by the at least one elastic film so as to block the sample liquid flow channel;
wherein the cover plate layer further comprises at least one first sample injection port, the at least one first limiting hole is located in a first region, and the at least one first sample injection port is located in a second region that is adjacent to the first region; and
the first channel layer further comprises at least one second through hole communicating with the at least one first sample injection port, and at least one first liquid inlet channel communicating with the at least one second through hole and the at least one second limiting hole.

2. The control valve structure according to claim 1, wherein an area of an orthographic projection of the at least one first limiting hole on a plane where the first channel layer is located is substantially the same as an area of an orthographic projection of the at least one second limiting hole on the plane where the first channel layer is located.

3. The control valve structure according to claim 2, wherein an area of an orthographic projection of the at least one valve core on the plane where the first channel layer is located is substantially the same as the area of the orthographic projection of the at least one second limiting hole on the plane where the first channel layer is located.

4. The control valve structure according to claim 1, wherein an area of an orthographic projection of the at least one first through hole on a plane where the first channel layer is located is smaller than an area of an orthographic projection of the at least one second limiting hole on the plane where the first channel layer is located.

5. The control valve structure according to claim 1, wherein the cover plate layer further comprises a second sample injection port, and the second sample injection port is located in a third region that is adjacent to the first region and on a side of the first region away from the second region;
the first channel layer further comprises a third through hole communicating with the second sample injection port;
the first adhesive layer further comprises a fourth through hole communicating with the third through hole, and a fifth through hole between a region where the fourth through hole is located and a region where the at least one first through hole is located, wherein the fifth through hole and a first through hole adjacent to the fifth through hole are covered by the same second limiting hole; and
the second channel layer further comprises a second liquid inlet channel communicating with the fourth through hole and the fifth through hole.

6. The control valve structure according to claim 5, wherein a distance between the fifth through hole and the first through hole adjacent to the fifth through hole ranges from 1 mm to 3 mm.

7. The control valve structure according to claim 5, wherein the fifth through hole and the first through hole are cylindrical holes, and diameters of the fifth through hole and the first through hole range from 0.5 mm to 2 mm.

8. The control valve structure according to claim 5, wherein the first adhesive layer comprises a lower adhesive layer, a release film and an upper adhesive layer disposed in a laminated mode; the lower adhesive layer is bonded to the second channel layer in a contacting mode, and the upper adhesive layer is bonded to the first channel layer in a contacting mode; the lower adhesive layer comprises a first via hole, a second via hole and a third via hole, the release film comprises a fourth via hole, a fifth via hole and a sixth via hole, and the upper adhesive layer comprises a seventh via hole, an eighth via hole and a ninth via hole; the first via hole, the fourth via hole and the seventh via hole communicate with one another to form the first through hole; the second via hole, the fifth via hole and the eighth via hole communicate with one another to form the fourth through hole; and the third via hole, the sixth via hole and the ninth via hole communicate with one another to form the fifth through hole.

9. The control valve structure according to claim 8, wherein, the release film further comprises a tenth via hole, the lower adhesive layer further comprises an eleventh via hole, the tenth via hole and the eleventh via hole communicate with each other, and an orthographic projection of the tenth via hole on a plane where the first channel layer is located and an orthographic projection of the eleventh via hole on the plane where the first channel layer is located each substantially overlap an orthographic projection of a second limiting hole on the plane where the first channel layer is located.

10. The control valve structure according to claim 5, further comprising: a second adhesive layer, configured to bond the cover plate layer and the first channel layer, wherein the second adhesive layer comprises at least one twelfth via hole communicating with the at least one first sample injection port and the at least one second through hole, a thirteenth via hole communicating with the second sample injection port and the third through hole, and at least one accommodating hole for accommodating the at least one elastic film.

11. The control valve structure according to claim 10, wherein, a thickness of the second adhesive layer is substantially equal to a thickness of the at least one elastic film in a direction perpendicular to a plane where the first channel layer is located.

12. The control valve structure according to claim 1, wherein the cover plate layer comprises at least one groove surrounding the at least one first limiting hole, and an orthographic projection of each of the at least one groove on a plane where the first channel layer is located overlaps an orthographic projection of a corresponding elastic film on the plane where the first channel layer is located.

13. The control valve structure according to claim 12, wherein each of the at least one groove comprises a first groove and/or a second groove, the first groove is in a side, away from the first channel layer, of the cover plate layer, the second groove is in a side, facing the first channel layer, of the cover plate layer, an area of an orthographic projection of the first groove on the plane where the first channel layer is located is substantially the same as an area of the orthographic projection of the corresponding elastic film on the plane where the first channel layer is located, and an orthographic projection of the second groove on the plane where the first channel layer is located is within the orthographic projection of the corresponding elastic film on the plane where the first channel layer is located.

14. The control valve structure according to claim 13, wherein a distance between a boundary of the orthographic projection of the second groove on the plane where the first channel layer is located and a boundary of the orthographic projection of the corresponding elastic film on the plane where the first channel layer is located ranges from 0.5 mm to 1.0 mm.

15. The control valve structure according to claim 13, wherein in the direction perpendicular to the plane where the first channel layer is located, a depth of the first groove ranges from 0.8 mm to 1.2 mm, and a depth of the second groove ranges from 10 μm to 50 μm.

16. The control valve structure according to claim 13, further comprising a protective film on a side, away from the first channel layer, of the cover plate layer, the protective film corresponds to the second groove, and the orthographic projection of the second groove on the plane where the first channel layer is located is within an orthographic projection of the corresponding protective film on the plane where the first channel layer is located.

17. A using method of the control valve structure according to claim 1, comprising:
controlling the at least one valve core to be at least partially located in the at least one first limiting hole, so that the at least one elastic film seals the at least one first limiting hole, and sample liquid is injected into the liquid outlet channel from second limiting holes via first through holes; and
controlling the at least one valve core to be at least partially located in the at least one second limiting hole, so that the at least one elastic film seals the at least one second limiting hole to prevent the sample liquid from being injected into the liquid outlet channel from the at least one second limiting hole via the at least one first through hole.

18. A microfluidic chip, comprising the control valve structure according to claim 1.

19. A nucleic acid extraction device, comprising a microfluidic chip and an electromagnet, wherein, the microfluidic chip is the microfluidic chip according to claim 18, and the electromagnet is on a side, away from the cover plate layer, of the second channel layer.

20. The using method according to claim 17, wherein, while controlling the at least one valve core to be at least partially located in the at least one first limiting hole, the method further comprises: injecting sample liquid into the at least one second limiting hole through the at least one first sample injection port, the at least one second through hole and the at least one first liquid inlet channel communicating with one another.

* * * * *